United States Patent
Bhupati et al.

(10) Patent No.: US 12,524,627 B2
(45) Date of Patent: Jan. 13, 2026

(54) LLM INTEGRATIONS FOR CONTENT ANALYSIS IN SOFTWARE APPLICATIONS

(71) Applicant: Microsoft Technology Licensing, LLC, Redmond, WA (US)

(72) Inventors: Dhirendra Kumar Bhupati, Sammamish, WA (US); Mrinal Kumar Sharma, Noida (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 210 days.

(21) Appl. No.: 18/313,857

(22) Filed: May 8, 2023

(65) Prior Publication Data
US 2024/0378396 A1 Nov. 14, 2024

(51) Int. Cl.
*G06F 40/40* (2020.01)
*G06F 9/451* (2018.01)
*G06F 40/20* (2020.01)

(52) U.S. Cl.
CPC ............. *G06F 40/40* (2020.01); *G06F 9/451* (2018.02); *G06F 40/20* (2020.01)

(58) Field of Classification Search
CPC .......... G06F 40/40; G06F 9/451; G06F 40/20; G06F 16/383; G06F 16/335
See application file for complete search history.

(56) References Cited

U.S. PATENT DOCUMENTS

| | | | |
|---|---|---|---|
| 8,838,518 B1 * | 9/2014 | Pocha | G09B 7/00 706/46 |
| 2009/0094561 A1 * | 4/2009 | Do | G06F 3/0425 715/863 |
| 2022/0113996 A1 * | 4/2022 | Brdiczka | G06N 20/00 |
| 2022/0229832 A1 * | 7/2022 | Li | G06F 16/24578 |
| 2023/0420097 A1 * | 12/2023 | Liang | G16H 10/20 |
| 2024/0202461 A1 * | 6/2024 | Pagnoni | G06F 16/345 |
| 2024/0320444 A1 * | 9/2024 | Maschmeyer | G06F 3/04845 |

OTHER PUBLICATIONS

International Search Report and Written Opinion received for PCT Application No. PCT/US2024/026922, Jul. 31, 1 2024, 13 pages.
International Preliminary Report on Patentability (Chapter I) received for PCT Application No. PCT/US2024/026922, mailed on Nov. 20, 2025, 08 pages.

* cited by examiner

*Primary Examiner* — Darioush Agahi

(57) ABSTRACT

Technology is disclosed herein for the integration of large language model (LLM) services for content analysis in productivity applications. In an implementation, an application identifies content associated with the application executing on the computing apparatus. The application identifies a context relating to the content, wherein the context comprises contextual information by which to evaluate the content. The application generates a prompt for an LLM service which includes the content and the context. The prompt requests an evaluation of the content to recommend supplemental content and submits the prompt to the LLM service. The application receives a response to the prompt from the LLM service which includes a suggestion for supplemental content based on the evaluation and displays, in a user interface of the application, a recommendation based on the suggestion from the LLM service.

20 Claims, 8 Drawing Sheets

LLM INTEGRATIONS FOR CONTENT ANALYSIS IN SOFTWARE APPLICATIONS

TECHNICAL FIELD

Aspects of the disclosure are related to the field of software applications and large language models and, in particular, to integrations there between.

BACKGROUND

In recent advances in AI technology, large language models (LLMs), which are a general-purpose type of AI model, have been developed which are capable of natural language communication. Transformer models are a type of AI model used in natural language processing that are designed to process sequences of words, such as sentences or paragraphs. LLMs such as Generative Pretrained Transformer (GPT) models and Bidirectional Encoder Representations from Transformer (BERT) models have been pretrained on an immense amount of data across virtually every domain of the arts and sciences and have demonstrated the capability of generating responses which are novel, open-ended, and unpredictable.

However, harnessing the capabilities of LLMs comes at a cost: LLM integration can introduce latency which negatively impacts the user experience; LLMs require a tremendous amount of compute power to function; and LLMs are known to hallucinate—that is, to imagine information which does not actually exist. Moreover, given the diverse subject matter in the training data used to train LLMs, LLMs may generate a response to an inquiry which diverges so far from what the user is asking that the response ends up being useless. Indeed, to generate useful content from an LLM to perform a particular task relies on the user's ability to effectively communicate with the LLM, that is to say, to write a prompt for the LLM which leverages an understanding of how the LLM works, which is typically beyond the ability of the average user.

Overview

Technology is disclosed herein for the integration of large language model (LLM) services for content analysis in software applications. In an implementation, an application identifies content associated with the application executing on the computing apparatus. The application identifies a context relating to the content which includes contextual information by which to evaluate the content. The application generates a prompt for an LLM service which includes the content and the context. The prompt requests an evaluation of the content to recommend supplemental content and submits the prompt to the LLM service. The application receives a response to the prompt from the LLM service which includes a suggestion for supplemental content based on the evaluation and displays, in a user interface of the application, a recommendation based on the suggestion from the LLM service.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
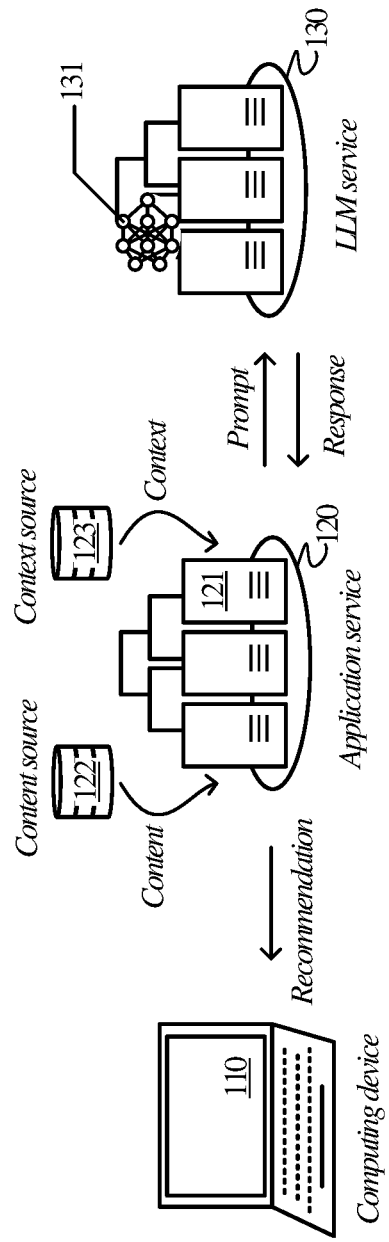
FIG. 1 illustrates an operational environment of an LLM integration with an application service in an implementation.

Various implementations of technology are disclosed herein for LLM integrations in software applications for identifying gaps in a user's subjective knowledge content, background knowledge, or preparation with respect to a context and generating suggestions to address the gaps. The user's subjective knowledge may be reflected in content, such as a resume, or in a compilation of user activity relating to the context, such as a user profile or viewing history. The context may be a task, activity, or subject matter which the user is seeking to be adequately prepared to address or engage in. Suggestions can include recommending additional training or training material or modifying the content to more appropriately reflect the user's subjective knowledge with respect to the context.

In an implementation, an application environment executes an LLM integration process which generates a prompt for an LLM service. The prompt queries the LLM service about a user's subjective knowledge ("content") with respect to a context, such as a presentation, a meeting, a tutorial, or a job description, to provide an analysis of the user's subjective knowledge with respect to the context. In some scenarios, the content includes a user's background (e.g., education, experience, etc.), skill set, or preparation with respect to the context. The user's subjective knowledge may be embodied in the user's resume, for example, or it may be reflected in the user's training profile, such as a tutorial viewing history. By evaluating the user's subjective knowledge against a task, activity, or subject matter, gaps in the content can be identified and suggestions can be formulated to address the gaps, thereby improving the user's preparedness for addressing or engaging in the context. Suggestions can include modifications to the user's resume, for example, or recommendations for additional training material to enhance the user's preparation for consuming the context. In some scenarios, the user is not a particular individual but instead an unspecified attendee or invitee invited to participate in or engage with a context, and the analysis is performed for a generic user profile.

The analysis of the content (i.e., user's subjective knowledge) with respect to a given context identifies gaps in the user's subjective knowledge with respect to the context and recommends supplemental content to address the gaps, thereby improving the likelihood of successful engagement with the context. Applications which support an LLM integration for identifying subjective knowledge gaps based on a context include word processing applications, presentation applications, spreadsheet applications, email applications, web browser applications, calendar applications, and other applications associated with tasks, activities, or subject matter with which a user may wish to engage.

In an implementation, if a word processing application, such as Microsoft® Word, detects to a high level of certainty that the user is creating or editing his/her resume or curriculum vitae (CV), an LLM integration of the word processing application may generate a prompt which evaluates the content of the resume (i.e., the user's subjective knowledge) against a context for the resume. For example, the context may be a job description for which the user is tailoring the resume in the application environment. An LLM service may be prompted to evaluate the content (i.e., the user's subjective knowledge content in the resume) against the job description (provided by the user), and to generate suggestions for modifying the resume to be more responsive to the job description. The LLM integration may identify additional subjective knowledge of the user from other sources, such as the user's LinkedIn® profile, to include in the prompt. In another scenario, if the user is composing a cover letter for a job application, the LLM integration may prompt the LLM service to perform an analysis of the content of the letter with respect to the job description or with respect to relevant information collected from other applications or sources, such as information about the hiring organization.

In some scenarios, the LLM integration may prompt the LLM service to generate a model or idealized version of the content, such as a resume or cover letter, then compare the content (i.e., the user's subjective knowledge or letter content reflecting the user's subjective knowledge) to the model version to identify gaps, then generate suggestions to address the gaps. The suggestions can include modifying the resume to include or highlight supplemental content, such as skills pulled from the user's LinkedIn profile, or modifying the organization of the cover letter to highlight certain elements according to a model cover letter generated by the LLM service according to the job application.

In other scenarios, a user may wish to obtain additional knowledge or skills training in a particular subject matter. For example, a user may perform a keyword search within an application of a content provider which yields one or more tutorials, such as training videos, training texts, training software, and the like. An LLM integration of the application generates a prompt for an LLM service to evaluate the user's subjective knowledge or background training against the context, i.e., the subject matter of the tutorial or keywords, and generate suggestions for supplemental material to be consumed by the user in preparation for engaging with the tutorial. In various implementations, the user's subjective knowledge may be determined from the user's education and/or experience captured from an external source, such as the user's LinkedIn profile, and may also include the user's viewing history or viewing profile sourced from the content provider. In some scenarios, the LLM service may also be prompted to generate a profile of an ideal user (e.g., an ideal viewer of a training video) for the given context (i.e., the tutorial), evaluate the content (i.e., the user's profile) against the idealized profile to identify gaps in the content, and recommend supplemental content accordingly.

For another example, a calendar application, such as Microsoft Outlook, may receive a calendar invite for a user, such as an email invitation to a meeting. An LLM integration of the calendar application may be prompted to evaluate the user's subjective knowledge (i.e., content) against the against the subject matter of the meeting (i.e., the context). The user's subjective knowledge may be identified or aggregated by the application service as a user profile which includes the user's actions relating to the subject matter, such as opening and reading attached documents, the user's attendance at other meetings, the number of invitees to the meeting, the user's role with respect to the meeting, actions of other invitees with respect to the meeting (acceptances, declines, etc.), and so on. The LLM service evaluates the user profile against the context and returns suggestions for supplemental content for the user to prepare for the meeting, such as a pre-reading list, videos to watch, or other actions to be taken by the user in preparation for the meeting.

In a similar scenario, where the context is a calendar invite for a meeting, the content to be analyzed may be a generic user profile rather than the profile of a specific individual. The prompt tasks the LLM service with evaluating a generic user profile against the subject matter of the meeting and recommending supplemental content, such as a pre-reading of related material, such as documents, slide decks, email chains, and other productivity items, for a generic user who may lack subjective knowledge with respect to the subject matter of the meeting.

For yet another example, a presentation application, such as Microsoft PowerPoint, may determine that a user is creating a slide presentation for a meeting. An LLM integration of the presentation application generates a prompt for an LLM service to evaluate a user profile or subjective knowledge of a generic user against the context, i.e., the subject matter of the slide deck. To evaluate the generic user profile, the LLM service may be tasked with generating a model slide deck for the given subject matter of the presentation. The LLM service compares the slide presentation with the model version and generates suggestions for supplemental content for the slide presentation, such as an agenda at the start of the slide deck, transitions between slides, a conclusion slide, related information to include in the slides, slide formatting recommendations, and so on. Suggestions may also include a list of suggested readings or videos.

In some implementations, the application or application service executing the LLM integration generates the prompt upon determining the intent of the user or the purpose of the content as the user is interacting with the application service. When the application determines the user's intent or the purpose of the content to a sufficiently high level of confidence or certainty (e.g., above a predetermined threshold), the application generates the prompt including the content (e.g., content of an electronic document or user profile) and the context (e.g., purpose of the electronic document or keywords of the user's search). In some implementations, the application sends an initial prompt to the LLM service via the LLM integration, including a sample of the content, a description of the content, and/or metadata of the content, to ascertain the intent or purpose associated with the content.

When the LLM service responds with an inference about the purpose of the content with confidence greater than a threshold value, the application sends a follow-up prompt requesting an evaluation of the content against the context. In still other scenarios, the application infers the user's intent via an algorithm independently from the LLM service, such as a fine-tuned AI model or algorithm. Upon receiving an indication that the intent of the user or the purpose of the document has been identified with sufficient confidence, the LLM integration generates the prompt to evaluate the content with respect to the context and recommend supplement content to address gaps in the content identified by the LLM service.

The context provided by the application service in the prompt provides a basis by which the LLM service evaluates the user's subjective knowledge or user profile to identify gaps and generates suggestions to address the gaps. In some scenarios, the content relates to a user's skill set or background knowledge, and the context is information by which the skill set or knowledge is evaluated for gaps-a task, activity, or subject matter to which the user's knowledge or skill set will be applied. In some scenarios, the context relates to a subject matter of a meeting, such as a slide presentation, and the user's subjective knowledge may include the user's attendance at other, related meetings or the user's opening (and presumably reading) emails relating to the subject matter. The supplemental content may include a list of readings or actions to be taken prior to the user attending the meeting. In some scenarios, the content of the presentation itself is evaluated against a model version of the slide deck which provides a context by which to identify gaps in the content and to recommend modifications or supplemental content.

The to-be-evaluated content can include the subjective knowledge of a user or a user profile based on information stored by the application, such as files, emails, or videos consumed by the user, or a search term(s) keyed into a search bar of the application by the user. The application service may collect additional information for aggregating a user profile from external sources such as the user's LinkedIn account.

Upon receiving output from the LLM service in response to a prompt for analysis of content with respect to a context, the LLM integration processes the output to display the suggestions or recommendations of the LLM service in the user interface of the application, such as in a task pane of the user interface. Processing the output can include displaying graphical buttons by which the user can learn more about a suggestion ("Explain this") or by which the application can generate a preview of the suggestion. Processing the output can also include configuring and displaying hyperlinks by which the user can navigate to supplemental content suggested by the LLM service.

Transformer models, of which LLMs are a type, are a class of deep learning models used in natural language processing (NLP) based on a neural network architecture which use self-attention mechanisms to process input data and capture contextual relationships between words in a sentence or text passage. Transformer models weigh the importance of different words in a sequence, allowing them to capture long-range dependencies and relationships between words. GPT, BERT, ERNIE (Enhanced Representation through kNowledge Integration), T5 (Text-to-Text Transfer Transformer), and XLNet models are types of transformer models which have been pretrained on large amounts of text data using a self-supervised learning technique called masked language modeling. This pretraining allows the models to learn a rich representation of language that can be fine-tuned for specific NLP tasks, such as text generation, language translation, or sentiment analysis.

Technical effects which may be appreciated from the technology disclosed herein include a streamlined interface by which the application or application service determines when to generate a prompt for the LLM and configures the prompt to include the identified content and the identified context. Content analysis may be performed by the LLM integration in the background and repeatedly over the course the user's interaction with the application-thus, the user experience receives the benefit of the technology spontaneously. The LLM integration also receives output from the LLM responsive to the prompt and processes the output for presentation in the user interface of the application.

Other technical advantages may be appreciated from the disclosed technology. Prompts tailored according to the disclosed technology reduce the amount of data traffic between the application service and the LLM for generating useful information for the user. For example, the disclosed technology streamlines the interaction between the user and the application service by keeping the LLM on task and reducing the incidence of erroneous, inappropriate, or off-target replies. The disclosed technology also promotes more rapid convergence, that is, reducing the number of interactions with the LLM to generate a desired result.

In addition, the disclosed technology focuses the generative activity of the LLM to improve the performance of the LLM without overwhelming the LLM (e.g., by exceeding the token limit). For example, the disclosed technology balances prompt size (e.g., the number of tokens in the prompt which must be processed by the LLM) with providing sufficient information to generate a useful response. Reducing or optimizing the token count of the prompt reduces the costs associated with using the LLM (e.g., a cost per token of the LLM) and results in faster processing. The net of streamlined interaction, more rapid convergence, and optimized prompt sizing is reduced data traffic, faster performance by the LLM, reduced latency, and concomitant improvements to productivity costs and to the user experience.

Turning now to the Figures, FIG. 1 illustrates operational environment 100 in an implementation. Operational environment 100 includes computing device 110, application service 120, and LLM service 130. Application service 120 hosts an application, such as a word processing application or content provider application, to endpoints such as computing device 110. Application service 120 includes LLM integration 121 by which to communicate with LLM service 130. Application service 120 receives information from content source 122 and context source 123. Computing device 110 may execute a client application (not shown) of application service 120 that provides a local user experience and that interfaces with application service 120. The application running locally with respect to computing device 110 may be a natively installed and executed application, browser-based application, mobile application, streamed application, or any other type of application capable of interfacing with application service 120. LLM integration 121 of application service 120 may be implemented a natively installed and executed application, a browser-based application, or a mobile application, and may execute in a stand-alone manner, within the context of another application such as a productivity application environment, a web browser, or in some other manner entirely. LLM service 130 hosts LLM 131, a generative pretrained transformer (GPT) computing architecture such as GPT-3®, GPT-3.5, ChatGPT®, or GPT-4.

Figure 8:
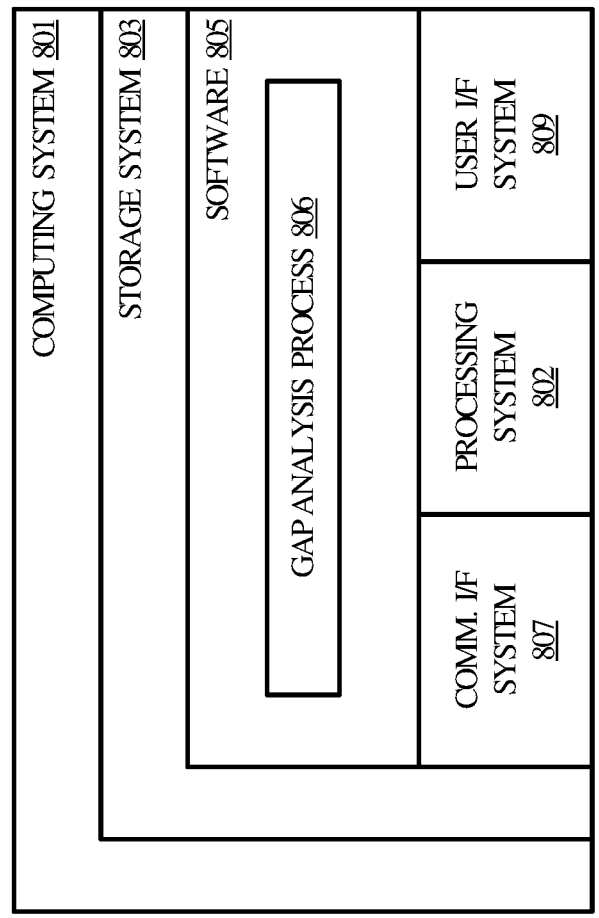
FIG. 8 illustrates a computing system suitable for implementing the various operational environments, architectures, processes, scenarios, and sequences discussed below with respect to the other FIGURES.

Computing device 110 is representative of computing devices, such as laptops or desktop computers, or mobile computing devices, such as tablet computers or cellular phones, of which computing device 801 in FIG. 8 is broadly representative. Computing device 110 communicates with application service 120 via one or more internets and intranets, the Internet, wired or wireless networks, local area networks (LANs), wide area networks (WANs), and any other type of network or combination thereof. A user interacts with a client application of application service 120 via a user interface of the application displayed on computing device 110.

Application service 120 is representative of one or more computing services capable of hosting an application, such as a productivity application, web browser application, or content provider application. Application service 120 interfaces with computing device 110 and with LLM service 130 via LLM integration 121. Application service 120 may be implemented in software in the context of one or more server computers co-located or distributed across one or more data centers. Application service 120 may host a client application onboard computing device 110 including a task or chat pane for displaying suggestions or recommendations received via LLM integration 121.

LLM service 130 is representative of one or more computing services capable of hosting LLM 131, an LLM computing architecture, and communicating with application service 120, such as through an application programming interface (API). LLM service 130 may be implemented in the context of one or more server computers co-located or distributed across one or more data centers. LLM 131 is representative of a deep learning AI transformer model, such as ChatGPT®, BERT, ERNIE, T5, XLNet, and the like.

In operation, computing device 110 displays a user interface for application service 120. Application service 120 receives information from content source 122 and context source 123, either of which may be components of application service 120 or external applications or sources. Application service 120, via LLM integration 121, generates a prompt for LLM service 130 which includes content identified in the information from content source 122 and context in the information from context source 123 identified by application service 120 as relating to the content. Interactions between application service 120 and LLM service 130 may occur at various times during a session between the user and application service 120. Prompts generated by application service 120 may take the form of a turn-based conversation, with successive prompts including the chat or conversation or the user's response to suggestions occurring thus far. LLM service 130 returns to application service 120 suggestions for modifying the content from content source 122 based on an evaluation of the content with respect to the context.

Application service 120 assesses the content to determine if/when to generate a prompt for analyzing content. In an implementation, application service 120 continually assesses the content from content source 122 to determine if/when to generate a prompt for LLM service 130. In some instances, application service 120 generates an initial prompt for LLM service 130 to ascertain a purpose of the content received from content source 122 or to ascertain whether context received from context source 123 relates to the content. For example, application service 120 may determine that the user is editing his/her resume or CV (i.e., the content) which relates to the user's subjective knowledge content. Application service 120 may post a message in a chat pane of the user interface querying the user about submitting a job description by which to generate suggestions for the resume.

Upon receiving a job title or description from the user, such as a link to a req or job posting or a job description pasted into the task pane, LLM integration 121 generates a prompt for LLM service 130 which includes at least a portion of the content and the context (i.e., job description) along with a request to analyze the content with respect to the context. The prompt specifies that the analysis should identify gaps in the content with respect to the context, then generate suggestions to address the gaps, such supplemental content gleaned from other information provided in the prompt or modifications to the content based on a model resume generated by LLM service 130 for the job description. In some scenarios, the prompt will include additional information relating to the content or, more specifically, to the user's education, training, experience, certifications, and so on, such as the user's LinkedIn profile.

Figure 2:
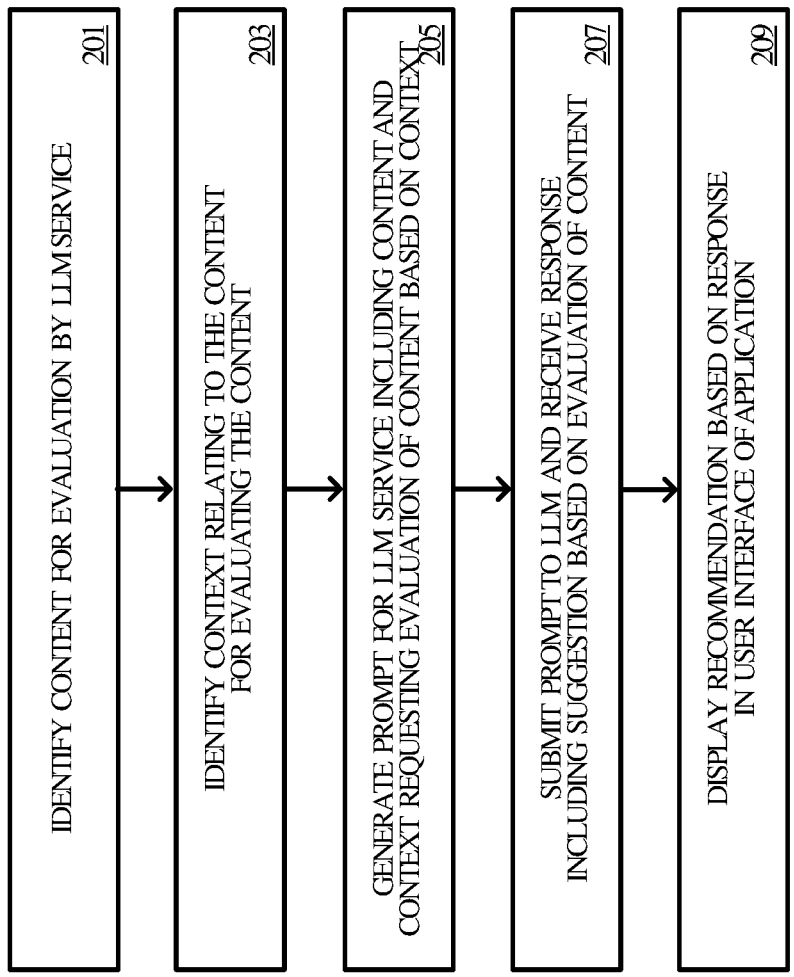
FIG. 2 illustrates a method of operating an application service with an LLM integration in an implementation.

FIG. 2 illustrates a method of performing a content analysis by an LLM integration of an application in an implementation, herein referred to as process 200. Process 200 may be implemented in program instructions in the context of any of the software applications, modules, components, or other such elements of one or more computing devices. The program instructions direct the computing device(s) to operate as follows, referred to in the singular for the sake of clarity.

An application service hosts an application such as a word processing application and displays a user interface for a client application of the application service on a user computing device remote from the application service. The application service executes an LLM integration by which to communicate with an LLM service to receive suggestions or recommendations for content associated with the application service, such as the contents of an electronic document of the word processing application.

The LLM integration of the application service identifies content to be evaluated with respect to a context (step 201). In an implementation, the content relates to a user's subjective knowledge content (e.g., education, experience, training, etc.), to a user profile relating to the user's background, education, experience, training, etc., or to a generic user profile. Sources of content can include, for example, information from an electronic document the user is editing, the user's LinkedIn profile, or the user's activities with respect to the context, such as a viewing history. In identifying the content, the LLM integration may select a portion of the document to include in the prompt, rather than including the entire document, which reduces the token count of the prompt to avoid hitting a token limit of the LLM service and allows for faster processing by the LLM service.

The LLM integration of the application service also identifies a context to be included in a prompt for an LLM service (step 203). In an implementation, the context is information which relates to the user's or to a generic user's subjective knowledge and provides a basis by which the content is to be evaluated. For example, if the user is browsing online videos, the LLM integration may identify from a keyword search instigated by the user that the user is searching for a tutorial video about a particular subject. The LLM integration may generate a prompt which includes the keywords of the search together with information that the user is browsing online videos as context by which to evaluate the content. The content to be evaluated with respect to the identified context may be a user profile aggregated by the LLM integration based on the user's video viewing history (e.g., from the browser history or from a user account with the content provider) and including information about the user's subjective knowledge drawn from the user's LinkedIn account or other sources.

Having identified the content and the context, the LLM integration generates a prompt for the LLM service (step 205). In an implementation, the LLM integration configures a JavaScript Object Notation (JSON) data object for submission to the LLM service via an API. The prompt may include any previous suggestions which were implemented by the user and may specify a token limit or a temperature (i.e., the degree of creativity) for the LLM's response. The prompt may also specify an output format for the LLM's response by which the LLM integration can parse the output to configure a display of any suggestions included in the response in the user interface. The prompt may also include other instructions which keep the LLM service on task, to prevent the LLM service from generating extraneous or superfluous content, reducing a completion token count of the output and resulting in faster processing as well as reduced latency.

With the prompt configured, the LLM service submits it to the LLM service and receives a response including one or more suggestions for supplemental content based on an evaluation of the content with respect to the context (step 207). In an implementation, the LLM integration receives the output, such as a JSON data object, which includes one or more suggestions responsive to the prompt. The suggestions may include, for example, additional videos which the LLM service has determined would be beneficial to the user to view in preparation for viewing a video tutorial, to strengthen or enhance the user's background knowledge, for example. In scenarios where the content relates to the user's subjective knowledge reflected in an electronic document, supplemental content may include a suggestion or recommendation to highlight certain information in the document by reformatting or rearranging information in the document. In scenarios where the content relates to material to be presented to multiple individuals, the suggestions may include preparatory materials chosen for a generic user based on a generic user profile generated by the LLM service for the evaluation.

Upon receiving output from the LLM service in response to the prompt, the LLM integration configures and displays the output in the user interface of the application (step 209). In an implementation, the LLM service parses the output in the specified format to display recommendations based on the one or more suggestions in a task pane of the user interface. The LLM integration may also display options for viewing additional information about the suggestion or for viewing a preview of the suggestion in the context.

Referring once again to FIG. 1, operational environment 100 includes a brief example of process 200 as employed by elements of operational environment 100 in an implementation of the technology disclosed herein.

In operational environment 100, a user at computing device 110 interacts with application service 120 relating to content from content source 122 and displayed in a client application or in a browser-based application on computing device 110.

As the user interacts with application service 120 with respect to content from content source 122, LLM integration 121 of application service 120 determines the intent or purpose of the content with a confidence level that exceeds a threshold value. Having exceeded the threshold value, LLM integration 121 generates a prompt for LLM service 130 including at least a portion of the content identified from information from content source 122 along with context identified by LLM integration 121 from information from context source 123. The prompt is configured according to a prompt template which LLM integration 121 selects based on the intent or purpose of the content. If LLM integration 121 determines that the content is a resume, for example, LLM integration 121 selects a prompt template according to that purpose, as opposed to a prompt template for, say, a keyword search or a presentation slide deck.

Having configured a prompt based on the identified content and identified context and according to a selected template, LLM integration 121 submits the prompt to LLM service 130. LLM 131, a pretrained generative transformer model, generates a response to the prompt based on instructions in the prompt and its own knowledge acquired through training. LLM service 130 returns the response to LLM integration 121 for processing and display in the user interface.

Figure 3:
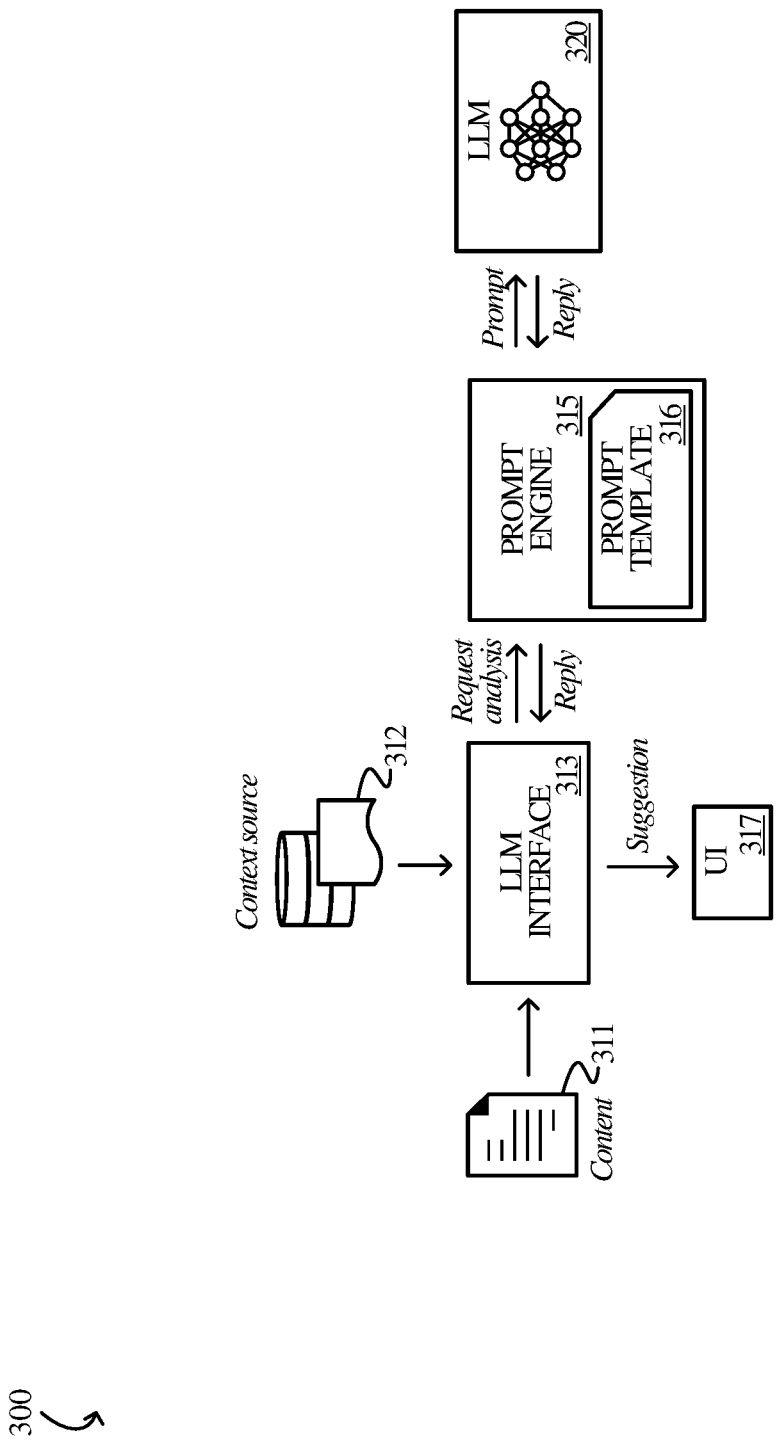
FIG. 3 illustrates an operational architecture of an LLM integration with an application service in an implementation.

Turning now to FIG. 3, FIG. 3 illustrates operational architecture 300 including content 311, LLM interface 313, prompt engine 315 including prompt template 315, and user interface (UI) 317 in an implementation. LLM interface 313 receives content 311 and context from context source 312 and communicates with prompt engine 315. Prompt engine 315 generates prompts for LLM 320 according to prompt template 316, sends the prompts to LLM 320, and receives replies to the prompts from LLM 320. Prompt engine 315 relays the output received from LLM 320 to LLM interface 313.

While in some scenarios content 311 may be displayed in UI 317, such as an electronic document in a word processing environment, in other scenarios content 311 is received by application service 310 but not displayed. For example, content 311 may include a user profile including information aggregated from other sources, such as the user's LinkedIn profile, the user's viewing history, or a user profile relating to the user's subjective knowledge, background knowledge, or training from other sources.

Figure 4:
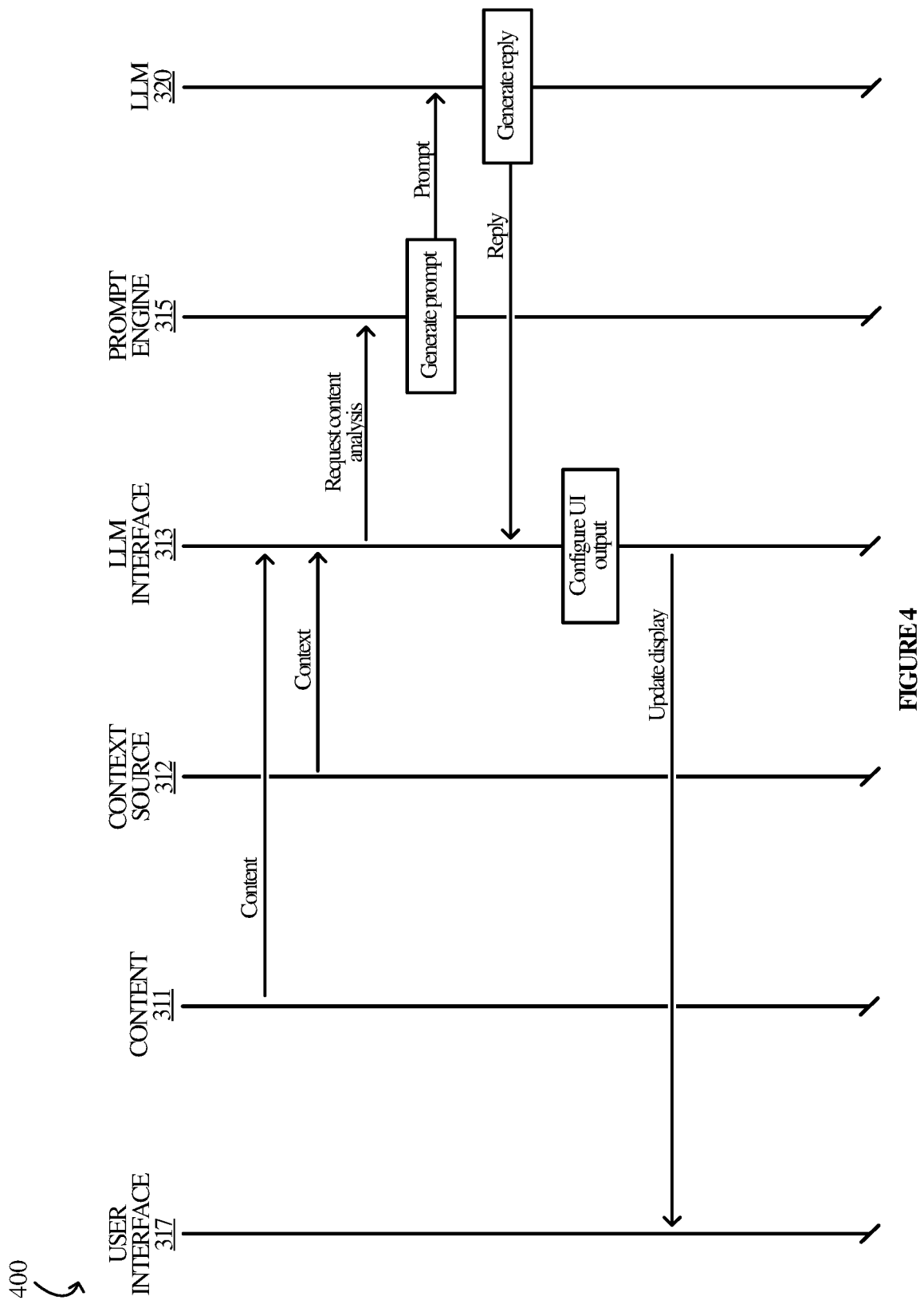
FIG. 4 illustrates an operational scenario for an LLM integration in an application service in an implementation.

FIG. 4 illustrates operational scenario 400 of an LLM integration with an application service for gap analysis and referring to elements of FIG. 3 in an implementation. In operational scenario 400, LLM interface 313 receives content 311 and context relating to content 311 from content source 312. LLM interface 313 sends a request to prompt engine 315 for an analysis of the content by LLM 320 along with recommendations for to address any gaps in the content identified by LLM 320.

Prompt engine 315 receives the request for a content analysis from LLM interface 313 and configures a prompt including the context and content information provided by LLM interface 313. In configuring the prompt, prompt engine 315 may determine a prompt template which includes tasks or rules relating to the manner in which LLM 320 responds to the prompt. Rules can include providing the output in a particular format (e.g., as a JSON object or in semantic tags), responding only to the subject matter of the prompt and nothing else (e.g., to preempt possible digressions by LLM 320), providing explanatory material for any suggestions provided, inferring a purpose or intent of the content, generating an idealized or model version of the content based on the context and comparing the submitted content to the model version to identify gaps in the content, providing a confidence level (e.g., as a percent) for each suggestion, and so on. Rules in the prompt templates may vary according to the type of content. For example, a prompt template relating to a slide presentation may have different rules than a prompt template relating to a calendar invite for a meeting.

Having transmitted the prompt to LLM 320, LLM 320 generates a response including one or more suggestions based on an evaluation of the content according to the supplied context and sends the response to LLM integration 313. LLM integration 313 parses the response and configures a display for UI 317. In some scenarios, LLM integration 313 may determine whether to display some, none, or all of suggestions provided in the response based on a confidence level of each suggestion. The prompt may direct LLM 320 to provide a confidence level based on its own evaluation of the suggestion relative to an inference made about the intent or purpose of the content.

LLM interface 313 transmits the configured display of recommendations based on the output from LLM 320 to UI 317, which may display the configured display in a task or chat pane in UI 317. UI 317 may receive user input indicating the user has selected a recommendation to preview or to implement in the context in UI 317.

Figure 5:
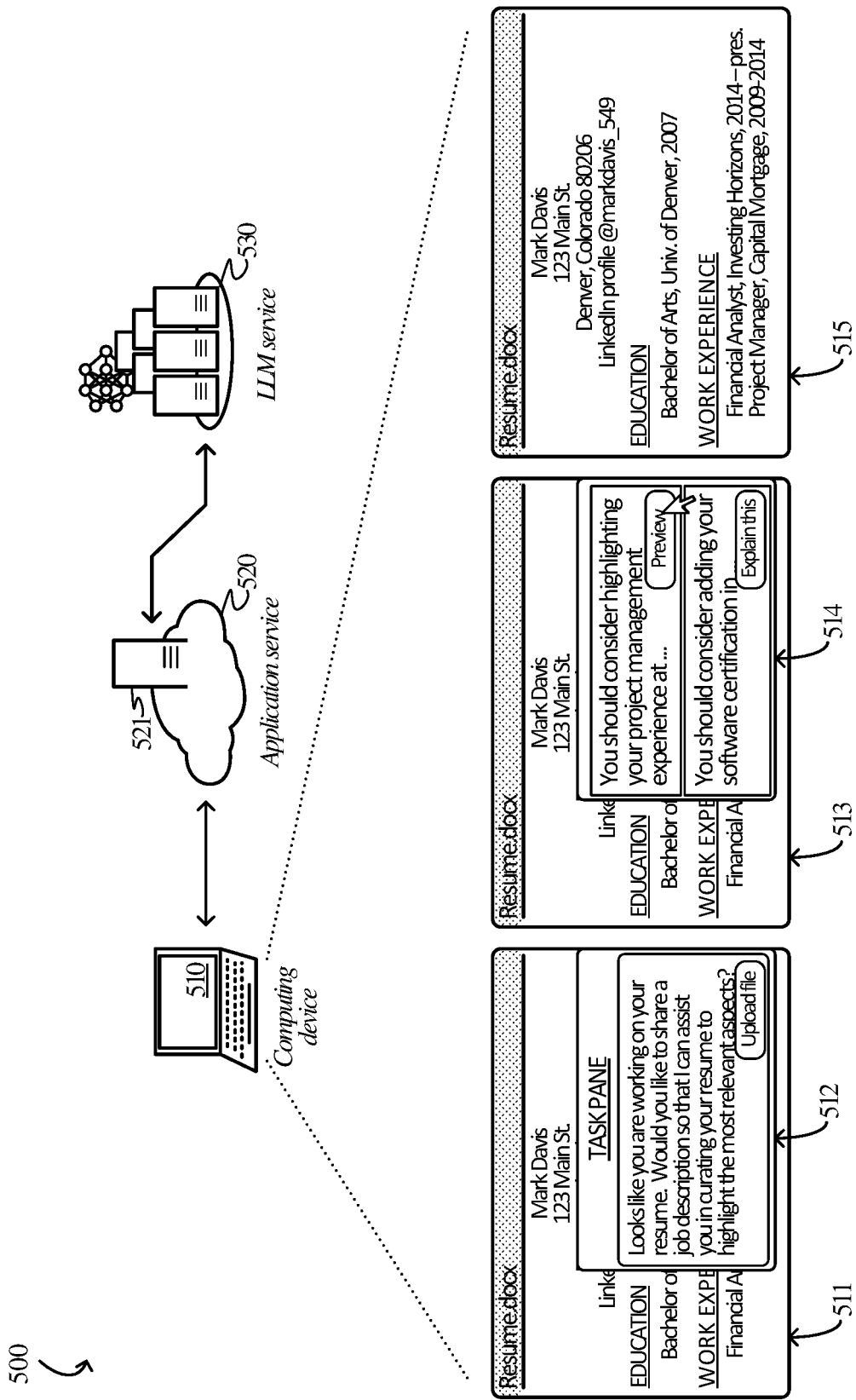
FIG. 5 illustrates an exemplary operational scenario for an LLM integration in an application service for a word processing application in an implementation.

FIG. 5 illustrates operational scenario 500 of an LLM integration of a software application service in an implementation. In operational scenario 500, application service 520 displays a word processing application in a user interface on computing device 510. The user interface presents user experiences 511, 513, and 515 of the word processing application.

In user experience 511, LLM integration 521 of application service 520 determines that the user is working on a resume. Upon determining the intent or purpose of the document to specified degree of certainty (i.e., with a level of confidence exceeding a threshold value), LLM integration 521 identifies the content as information from the resume relating to the user's subjective knowledge.

In an implementation, LLM integration 521 ascertains the purpose of the document using internal algorithms, such as an AI model, or LLM integration 521 sends at least a portion of the content in an initial prompt to LLM service 530 to identify the purpose. In some implementations, LLM integration 521 sends a single prompt to LLM service 530 which identifies the purpose of content and provides an evaluation of the content.

Continuing operational scenario 500, having ascertained that the document is a resume, LLM integration 521 prompts the user to submit a job description to which the resume is being tailored. In evaluating the content, LLM service 530 may be tasked with generating a model resume according to the job description provided by the user and identifying gaps in the content by comparing the content to the model resume. In addition, LLM integration 521 may parse the content to identify related sources of information for generating suggestions. For example, LLM integration 521 may determine from the content that the user has a LinkedIn profile and may retrieve from the user's LinkedIn profile other indicators of the user's subjective knowledge, such as the user's education, work experience, training, and skill set. LLM integration 521 includes the additional information in the prompt to LLM service 530. In user experience 513, the user interface displays two suggestions based on an evaluation of the content by LLM service 530 based on the content, context, and additional information provided in the prompt.

In user experience 515, the user has selected to preview a suggestion in the electronic document. As illustrated in user experience 515, application service 520 displays supplemental content relating to information from the user's LinkedIn profile based on the evaluation of the content performed by LLM service 530.

Figure 6:
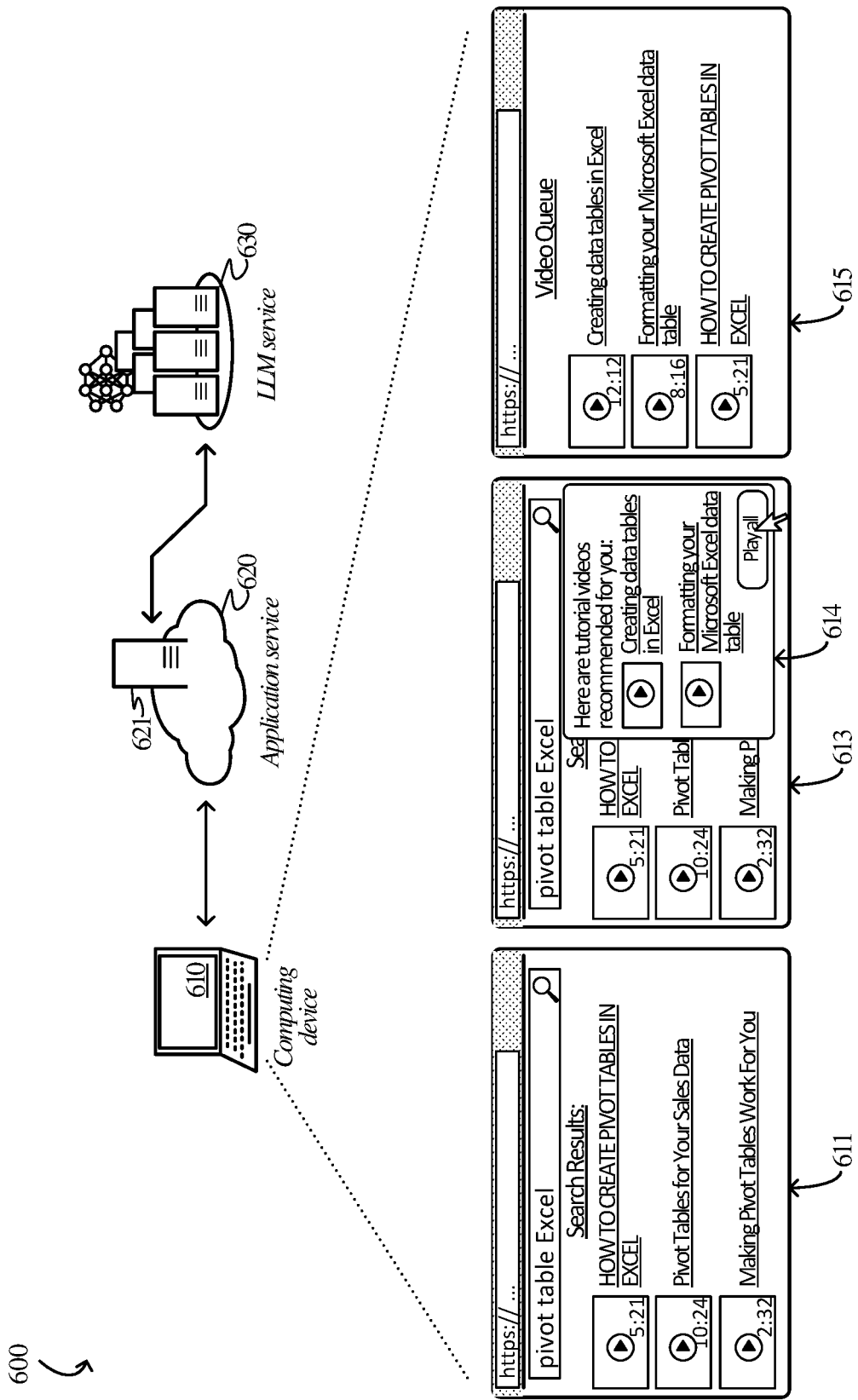
FIG. 6 illustrates an exemplary operational scenario for an LLM integration in an application service for a web browser in an implementation.

FIG. 6 illustrates operational scenario 600 of an LLM integration in a software application service in an implementation. In operational scenario 600, application service 620 displays a web browser in a user interface on computing device 610.

In user experience 611, LLM integration 621 determines that the user has searched for tutorial videos relating to a skill (in this example, creating pivot tables in a spreadsheet application). LLM integration 621 generates a prompt indicating the context which includes the search term and the application environment or website in which the search was performed. LLM integration 621 also includes information relating to the user's subjective knowledge and/or a user profile including the user's history of viewing related tutorials. To aggregate a user profile for content analysis, LLM integration 621 may gather the user's viewing history in the application environment or from the website and the user's background knowledge, skills, and training from external sources, such as the user's LinkedIn profile.

In user experience 613, LLM integration 621 displays task pane 614 with videos recommended to the user based on the content and the context. As illustrated, LLM service 630 has determined that, based on the user's background knowledge and viewing history, the user should view precursor training material prior to viewing tutorials relating to the search term. Application service 620 generates a video playlist based on the suggestion. In task pane 614, the user selects to view the recommended videos. In user experience 615, application service 620 configures a video queue or playlist of recommended videos based on the suggestion followed by a tutorial video relating to the user's search.

Figure 7:
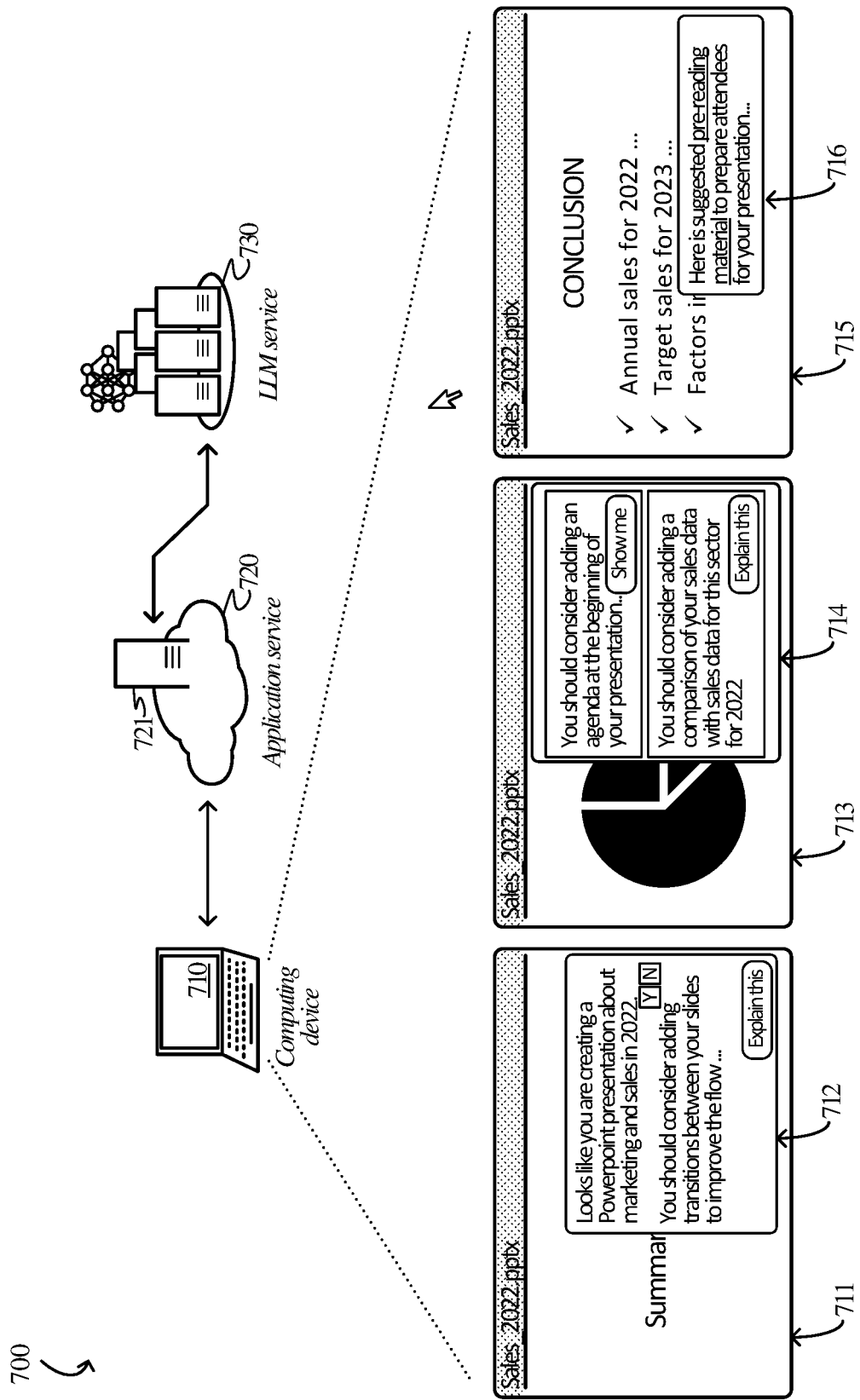
FIG. 7 illustrates an exemplary operational scenario for an LLM integration in an application service for a presentation application in an implementation.

FIG. 7 illustrates operational scenario 700 of an LLM integration in a software application service in an implementation. In operational scenario 700, application service 620 displays a presentation application in a user interface on computing device 710.

In user experience 711, LLM integration 721 determines the subject matter of a presentation slide deck that a user is viewing or editing on computing device 710 and configures a prompt including at least a portion of the material of the slide deck for submission to LLM service 730. LLM integration 721 also identifies that the content is a generic user profile to be evaluated with respect to the presentation slide deck. In some implementations, LLM integration 721 may generate and display a query to the user to confirm the inferred intent. The prompt tasks LLM service 730 with generating a model presentation slide deck to be presented to a generic user or an intended viewer and generating suggestions relating to the intended viewer's consumption of the presentation. LLM integration 721 may also include additional information from related sources, such as documents, emails, calendar events, and so on, for the evaluation performed by LLM service 730. In task pane 712 of user experience 711, application service 720 displays a recommendation based on output from LLM service 730: adding transitions between the slides to improve the flow for the intended viewer.

As the user continues to edit the presentation slide deck, LLM integration 721 continues to configure and send prompts to LLM service 730 requesting an evaluation of the content. In task pane 714 of user experience 713, application service 720 displays additional recommendations based on suggestions from LLM service 730, such as providing an agenda for the presentation for the benefit of the intended viewer and enhancing the intended viewer's subjective knowledge by providing supplemental sales data for the sector. In task pane 716 of user experience 715, application service 720 displays a recommendation to provide a pre-reading list for intended viewers of the slide deck.

FIG. 8 illustrates computing device 801 that is representative of any system or collection of systems in which the various processes, programs, services, and scenarios disclosed herein may be implemented. Examples of computing device 801 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 801 may be implemented as a single apparatus, system, or device or may be implemented in a distributed manner as multiple apparatuses, systems, or devices. Computing device 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements gap analysis process 806, which is (are) representative of the gap analysis processes discussed with respect to the preceding FIGURES, such as process 200. When executed by processing system 802, software 805 directs processing system 802 to operate as described herein for at least the various processes, operational scenarios, and sequences discussed in the foregoing implementations. Computing device 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including gap analysis process 806) may be implemented in program instructions and among other functions may, when executed by processing system 802, direct processing system 802 to operate as described with respect to the various operational scenarios, sequences, and processes illustrated herein. For example, software 805 may include program instructions for implementing a gap analysis process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing device 801 is representative) overall from a general-purpose computing system into a special-purpose computing system customized to support gap analysis processes in an optimized manner. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
   one or more computer-readable storage media;
   one or more processors operatively coupled with the one or more computer-readable storage media; and
   program instructions stored on the one or more computer-readable storage media that, when executed by the one or more processors, direct the computing apparatus to at least:
   identify content of a document associated with an application executing on the computing apparatus;
   receive, via a user interface of the application, user input comprising a context relating to the content, wherein the context comprises information by which to evaluate the content;
   submit, to a large language model (LLM) service, a first prompt including the content of the document, wherein the first prompt tasks the LLM service with generating an inferred purpose of the content and a confidence score associated with the inferred purpose;
   receive a first response comprising the inferred purpose and the confidence score;
   determine that the confidence score exceeds a threshold value;
   in response to determining that the confidence score exceeds the threshold value, select a prompt template based on the inferred purpose;
   generate a second prompt for the LLM service based on the prompt template, wherein the second prompt includes the content of the document and the context, and wherein the second prompt requests an evaluation of the content based on the context and a suggestion based on the evaluation;
   submit the second prompt to the LLM service;
   receive a second response to the second prompt from the LLM service, wherein the response comprises the suggestion based on the evaluation;
   enable display, in the user interface of the application, of a recommendation comprising the suggestion from the LLM service; and
   receive, via the user interface, user input indicative of a request to implement the recommendation in the document.

2. The computing apparatus of claim 1, wherein the application comprises a productivity application.

3. The computing apparatus of claim 2, wherein the program instructions further direct the computing apparatus to:
   display the inferred purpose generated by the LLM service in the user interface; and
   receive, via the user interface, a user input comprising a confirmation of the inferred purpose.

4. The computing apparatus of claim 3, wherein the second prompt further requests the evaluation of the content based on comparing the content with model content generated by the LLM service based on the context.

5. The computing apparatus of claim 4, wherein to enable display of the recommendation in the user interface of the productivity application, the program instructions direct the computing apparatus to display the recommendation in a task pane of the user interface, and wherein the program instructions further direct the computing apparatus to receive, in the task pane, the user input indicative of the request to implement the recommendation in the document.

6. The computing apparatus of claim 5, wherein the context includes document metadata.

7. The computing apparatus of claim 6, wherein the content comprises information relating to a user profile of a user associated with the document, and wherein the program instructions further direct the application to identify, from the document, a source of information relating to the user profile and to collect the information relating to the user profile from the source, wherein the source is different from the application.

8. The computing apparatus of claim 1, wherein the content comprises information relating to a user profile of a user and the context comprises subject matter of a tutorial.

9. The computing apparatus of claim 1, wherein the prompt template comprises an instruction to the LLM service to generate the second response in a specified format, and wherein to enable the display of the recommendation in the user interface, the program instructions direct the computing apparatus to parse the second response from the LLM service to extract the suggestion from the second response according to the specified format for display in the user interface.

10. A method of operating an application service, the method comprising:
    identifying content of a document associated with the application service executing on a computing device;
    receiving, via a user interface of the application service, user input comprising a context relating to the content, wherein the context comprises contextual information by which to evaluate the content;

submitting, to a large language model (LLM) service, a first prompt including the content of the document, wherein the first prompt tasks the LLM service with generating an inferred purpose of the content and a confidence score associated with the inferred purpose;

receiving a first response comprising the inferred purpose and the confidence score;

determining that the confidence score exceeds a threshold value;

in response to determining that the confidence score exceeds the threshold value, select a prompt template based on the inferred purpose;

generating a second prompt for the LLM service based on the prompt template, wherein the second prompt includes the content of the document and the context, and wherein the second prompt requests an evaluation of the content based on the context and a suggestion based on the evaluation;

submitting the second prompt to the LLM service;

receiving a second response to the second prompt from the LLM service, wherein the response comprises the suggestion based on the evaluation;

enabling display, in the user interface of the application service, of a recommendation based on the suggestion from the LLM service; and receiving, via the user interface, user input indicative of a request to implement the recommendation in the document.

11. The method of claim 10, wherein the application service comprises a productivity application.

12. The method of claim 11, further comprising displaying the inferred purpose generated by the LLM service in the user interface; and receiving, via the user interface, a user input comprising a confirmation of the inferred purpose.

13. The method of claim 12, wherein the second prompt requests the evaluation of the content based on comparing the content with model content generated by the LLM service based on the context.

14. The method of claim 13, wherein enabling display of the recommendation in the user interface of the application service further comprises displaying the recommendation in a task pane of the user interface, and wherein the method further comprises receiving, in the task pane, the user input indicative of the request to implement the recommendation in the document.

15. The method of claim 14, wherein the context includes document metadata.

16. The method of claim 14, wherein the context comprises information relating to a user profile of a user associated with the content, and wherein the method further comprises: identifying from the document a source of information relating to the user profile; and collecting the information relating to the user profile from the source, wherein the source is different from the application service.

17. The method of claim 10, wherein the content comprises information relating to a user profile of a user and the context comprises subject matter of a tutorial.

18. A method of operating an application service, the method comprising:

identifying content associated with the application service executing on a computing device, wherein the application service comprises a web browser application and wherein the content comprises results of a content search;

receiving, via a user interface of the application service, user input comprising a context relating to the content, wherein the context comprises contextual information by which to evaluate the content;

submitting, to a large language model (LLM) service, a first prompt including the content, wherein the first prompt tasks the LLM service with generating an inferred purpose of the content and a confidence score associated with the inferred purpose;

receiving a first response comprising the inferred purpose and the confidence score;

determining that the confidence score exceeds a threshold value;

in response to determining that the confidence score exceeds the threshold value, selecting a prompt template based on the inferred purpose;

generating a second prompt for the LLM service based on the prompt template, wherein the second prompt includes the content and the context, and wherein the second prompt requests an evaluation of the content based on the content and a suggestion based on the evaluation;

submitting the second prompt to the LLM service;

receiving a second response to the second prompt from the LLM service, wherein the response comprises the suggestion based on the evaluation; and enable display, in the user interface of the application service, of a recommendation based on the suggestion from the LLM service.

19. The method of claim 18, wherein the context comprises a search term of the content search.

20. The method of claim 19, wherein the context further comprises a viewing history of a user associated with the content.

* * * * *